(12) United States Patent
Ikarashi

(10) Patent No.: US 11,868,510 B2
(45) Date of Patent: *Jan. 9, 2024

(54) SECURE CROSS TABULATION SYSTEM, SECURE COMPUTATION APPARATUS, SECURE CROSS TABULATION METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 460 days.

This patent is subject to a terminal disclaimer.

(21) Appl. No.: 17/052,214

(22) PCT Filed: May 14, 2019

(86) PCT No.: PCT/JP2019/019092
§ 371 (c)(1),
(2) Date: Nov. 2, 2020

(87) PCT Pub. No.: WO2019/221108
PCT Pub. Date: Nov. 21, 2019

(65) Prior Publication Data
US 2022/0292223 A1    Sep. 15, 2022

(30) Foreign Application Priority Data

May 17, 2018   (JP) ................................ 2018-095350

(51) Int. Cl.
*H04L 29/06*     (2006.01)
*G06F 21/64*     (2013.01)

(52) U.S. Cl.
CPC .................................... *G06F 21/64* (2013.01)

(58) Field of Classification Search
CPC ........................................................ G06F 21/64
See application file for complete search history.

(56) References Cited

U.S. PATENT DOCUMENTS

| 4,730,259 A | * | 3/1988 | Gallant | ................... | G06N 3/042 |
| | | | | | 706/903 |
| 2013/0212354 A1 | * | 8/2013 | Mimar | ................ | G06F 9/30021 |
| | | | | | 712/E9.023 |

(Continued)

FOREIGN PATENT DOCUMENTS

| JP | 4849541 | * | 1/2012 |
| JP | 2010108488 | * | 10/2013 |

(Continued)

OTHER PUBLICATIONS

Wikipedia, "conditional computer programming", https://en.wikipedia.org/w/index.php?title=Conditional_(computer_programming)&oldid=114168452, Wikipedia, Mar. 10, 2007 (Year: 2007).*

(Continued)

*Primary Examiner* — Taghi T Arani
*Assistant Examiner* — Lin Chang
(74) *Attorney, Agent, or Firm* — XSENSUS LLP

(57) ABSTRACT

To efficiently determine cross tabulation while keeping confidentiality. A flag conversion unit (11) converts a format of a share of a flag that represents a boundary between groups. A boundary number setting unit (12) generates a share of a vector in which the next element number is set when the flag representing a group boundary is true and the number of records is set when the flag is false. A sorting unit (13) generates a share of a sorted vector which has been sorted by a permutation that moves vectors such that the last elements of each group are sequentially arranged from beginning A count calculation unit (14) sets a difference (Continued)

between the value of one element and the value of the preceding element in the sorted vector and generates a share of a vector representing the number of records in each group.

14 Claims, 4 Drawing Sheets

(56) References Cited

U.S. PATENT DOCUMENTS

| | | | |
|---|---|---|---|
| 2014/0019467 A1* | 1/2014 | Itoh | G06F 21/6254 707/757 |
| 2016/0210472 A1* | 7/2016 | Ikarashi | G06F 21/6218 |
| 2016/0321958 A1* | 11/2016 | Ikarashi | G06F 21/60 |
| 2019/0141051 A1* | 5/2019 | Ikarashi | H04L 63/00 |

FOREIGN PATENT DOCUMENTS

| | | | |
|---|---|---|---|
| JP | 5758315 | * | 8/2015 |
| JP | 6023858 | * | 11/2016 |

OTHER PUBLICATIONS

Furukawa et al. "Improving the confidential data totalization", 2013 Seventh International Conference on Innovative Mobile and Internet Services in Ubiquitous Computing, p. 826-830, 2013 (Year: 2013).*

Ikarashi et al., "Secure Database Operations Using an Improved 3-party Verifiable Secure Function Evaluation", The 2011 Symposium on Cryptography and Information Security, The Institute of Electronics, Information and Communication Engineers, Kokura, Japan, Jan. 25-28, 2011, pp. 1-8 (18 pages including English Translation).

* cited by examiner

SECURE CROSS TABULATION SYSTEM, SECURE COMPUTATION APPARATUS, SECURE CROSS TABULATION METHOD, AND PROGRAM

CROSS-REFERENCE TO RELATED APPLICATIONS

The present application is based on PCT filing PCT/JP2019/019092, filed May 14, 2019, which claims priority to JP 2018-095350, filed May 17, 2018, the entire contents of each are incorporated herein by reference.

TECHNICAL FIELD

The present invention relates to secure computation techniques, and in particular to techniques for calculating an aggregate function while keeping confidentiality.

BACKGROUND ART

An aggregate function is an operation to obtain statistical values that have been grouped based on the value of a key attribute when there are a key attribute and a value attribute in a table. An aggregate function is also called group-by operation. A key attribute is an attribute that is used for grouping table records, such as official position or gender, for example. A value attribute is an attribute that is used for calculating statistical values, such as salary or body height, for example. Group-by operation can be an operation to obtain the average body heights by gender when the key attribute is gender, for example. The key attribute may also be a composite key consisting of multiple attributes: for example, it may be an operation to obtain the average body height of males in their teens, the average body height of males in their twenties, and so on when the key attributes are gender and age. Non-Patent Literature 1 describes a method that performs group-by operation by secure computation.

Cross tabulation is one of aggregate functions, referring to an operation to sum up the number of records in each group when a table is grouped based on the values of key attributes. Cross tabulation is also called group-by count. Group-by count refers to an operation like obtaining the number of males in their teens, the number of males in their twenties, and so on when the key attributes are gender and age, for example.

PRIOR ART LITERATURE

Non-Patent Literature

Non-Patent Literature 1: Dai Ikarashi, Koji Chida, Koki Hamada, and Katsumi Takahashi, "Secure Database Operations Using An Improved 3-party Verifiable Secure Function Evaluation", The 2011 Symposium on Cryptography and Information Security, 2011.

SUMMARY OF THE INVENTION

Problems to be Solved by the Invention

The conventional secure computation technique is not efficient as it requires a log(n) number of communications in order to determine a group-by count, where n is the number of calculation entities.

In view of the technical problem described above, an object of the present invention is to provide a technique that is capable of efficiently determining a group-by count while keeping confidentiality.

Means to Solve the Problems

To solve the above-described problem, a secure cross tabulation system according to one aspect of the present invention includes a plurality of secure computation apparatuses, where m is an integer equal to or greater than 2; $[e]:=[e_0], \ldots, [e_{m-1}]$ is a share obtained by secret sharing of a flag $e:=e_0, \ldots, e_{m-1}$ in which last elements of each group are true and other elements are false when a table formed of a key attribute and a value attribute is grouped based on a value of the key attribute; $\{\{\sigma\}\}$ is a share obtained by secret sharing of a permutation $\sigma$ which moves elements such that the last elements of each group are sequentially arranged from beginning when the table is grouped based on the value of the key attribute; and g is a maximum number of such groups. Each of the secure computation apparatuses includes: a boundary number setting unit that generates a share $[x]$ that becomes a vector $x:=x_0, \ldots, x_{m-1}$ when reconstructed, using the share $[e]$, by setting $[x_i]:=[i+1]$ when $[e_i]$ is true and set $[x_i]:=[m]$ when $[e_i]$ is false for each integer i greater than or equal to 0 and smaller than or equal to m−1; a sorting unit that generates a share $[\sigma(x)]$ that becomes a sorted vector $\sigma(x)$ which is the vector x as sorted by the permutation $\sigma$ when reconstructed, using the share $[x]$ and the share $\{\{\sigma\}\}$; and a count calculation unit that generates a share $[c]$ that becomes a vector $c:=c_0, \ldots, c_{\min(g,m)-1}$ representing the number of records in each group when reconstructed, using the share $[\sigma(x)]$, by setting $[c_i]:=[\sigma(x)_i - \sigma(x)_{i-1}]$ for each integer i greater than or equal to 1 and smaller than or equal to $\min(g,m)-1$ and setting $[c_0]:=[\sigma(x)_0]$.

Effects of the Invention

The secure cross tabulation techniques of the present invention can efficiently determine a group-by count with the O(1) number of communications while keeping confidentiality.

DETAILED DESCRIPTION OF THE EMBODIMENTS

Figure 1:
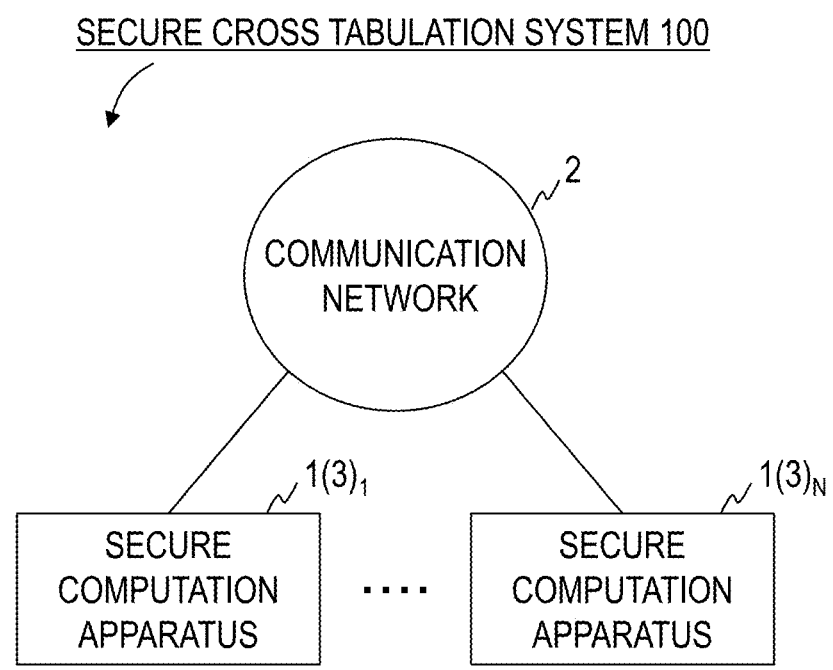
FIG. 1 illustrates a functional configuration of a secure cross tabulation system.

Embodiments of the present invention are described below in detail. In the drawings, components having the same function are given the same numbers and overlapping description is omitted.

$[x] \in [F]$ indicates that a certain value x is concealed by secret sharing and the like on a certain ring F. $\{b\} \in \{B\}$ indicates that a certain one bit value b is concealed by secret sharing and the like on a ring B capable of representing one bit. $\{\{s\}\} \in \{\{S_m\}\}$ indicates that a certain permutation s belonging to a set $S_m$ of permutations with m elements is concealed by secret sharing and the like. In the following, a secret-shared value is also called a "share".

For sorting (including stable sort) in secure computation used in an embodiment, the sorting described in Reference Literature 1 can be used, for example. For a share $\{\{s\}\}$ of permutation s, the hybrid permutation $\{\{\pi\}\}$ described in Reference Literature 1 may be used.

[Reference Literature 1] Dai Ikarashi, Koki Hamada, Ryo Kikuchi, and Koji Chida, "A Design and an Implementation of Super-high-speed Multi-party Sorting: The Day When Multi-party Computation Reaches Scripting Languages", Computer Security Symposium 2017.

Embodiment

Referring to FIG. 1, an exemplary configuration of a secure cross tabulation system 100 according to an embodiment is described. The secure cross tabulation system 100 includes N ($\geq 2$) secure computation apparatuses $1_1, \ldots, 1_N$. In the present embodiment, the secure computation apparatuses $1_1, \ldots, 1_N$ are respectively connected to a communication network 2. The communication network 2 is a circuit-switched or packet-switched communication network configured to allow mutual communications among the connected apparatuses, and, for example, the Internet, local area network (LAN), or wide area network (WAN) may be used. The apparatuses do not necessarily be capable of communicating online via the communication network 2. For example, they may be configured such that information entered to the secure computation apparatuses $1_1, \ldots, 1_N$ is stored in a portable recording medium such as magnetic tape or a USB memory and the information is entered offline to the secure computation apparatuses $1_1, \ldots, 1_N$ from the portable recording medium.

Figure 2:
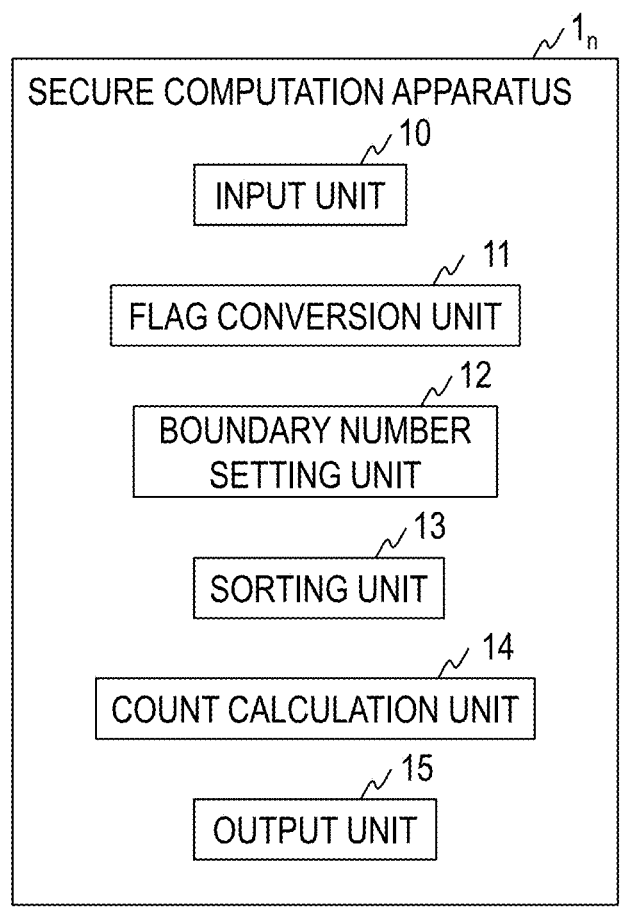
FIG. 2 illustrates a functional configuration of a secure computation apparatus.

Referring to FIG. 2, an exemplary configuration of a secure computation apparatus $1_n$ (n=1, ..., N) included in the secure cross tabulation system 100 is described. The secure computation apparatus $1_n$ includes, for example, an input unit 10, a flag conversion unit 11, a boundary number setting unit 12, a sorting unit 13, a count calculation unit 14, and an output unit 15, as shown in FIG. 2. By the secure computation apparatus $1_n$ ($1 \leq n \leq N$) performing processing at the steps described below in cooperation with other secure computation apparatus $1_{n'}$ (n'=1, ..., N, where n≠n'), a secure cross tabulation method according to an embodiment is implemented.

The secure computation apparatus $1_n$ is a special apparatus configured by loading of a special program into a well-known or dedicated computer having a central processing unit (CPU), main storage unit (random access memory: RAM), and the like, for example. The secure computation apparatus $1_n$ executes various kinds of processing under control of the central processing unit, for example. Data input to the secure computation apparatus $1_n$ and data resulting from processing are stored in the main storage unit, for example, and the data stored in the main storage unit is read into the central processing unit as necessary to be used for other processing. The processing units of the secure computation apparatus $1_n$ may at least partially consist of hardware such as an integrated circuit.

Figure 3:
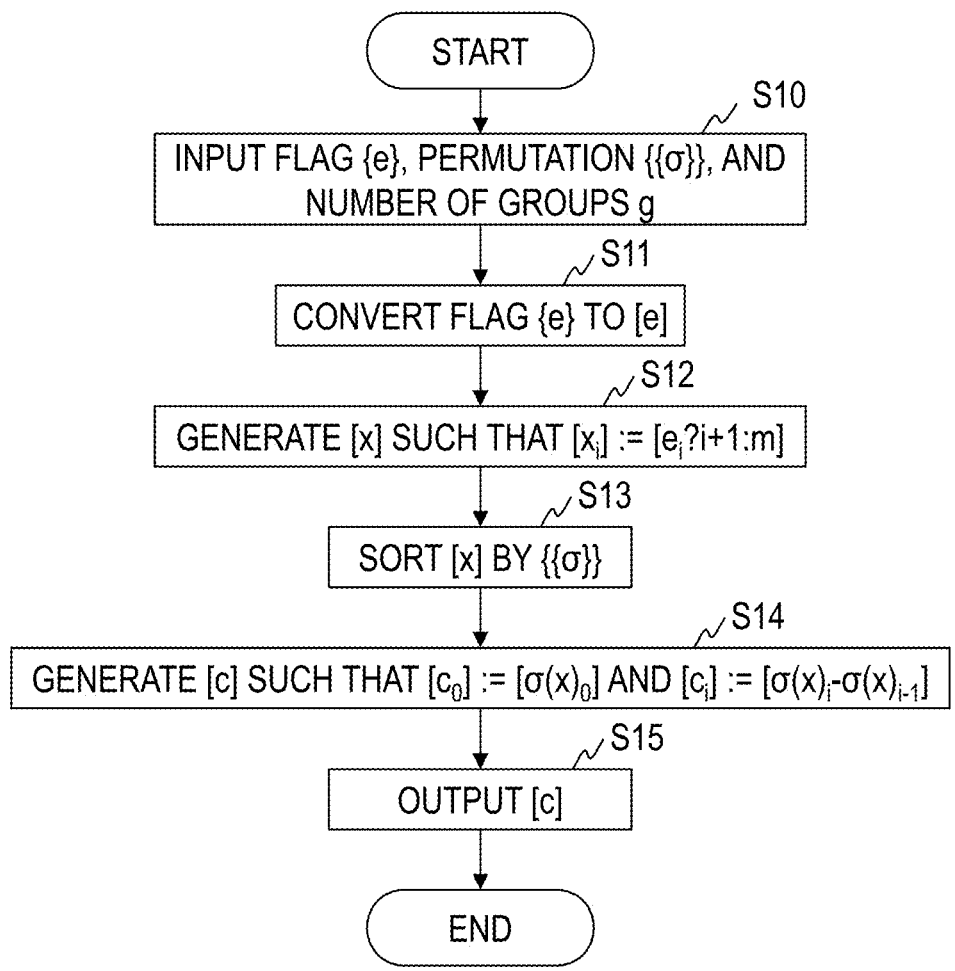
FIG. 3 illustrates a processing procedure of a secure cross tabulation method.

Referring to FIG. 3, a processing procedure of a secure cross tabulation method for execution by the secure cross tabulation system 100 of the embodiment is described.

At step S10, the input unit 10 of each secure computation apparatus $1_n$ receives, as input, a share $\{e\} \in \{B\}^m$ obtained by concealing a flag $e \in B^m$ by secret sharing, a share $\{\{\sigma\}\} \in \{\{S_m\}\}$ obtained by concealing of a permutation $\sigma$ by secret sharing, and a maximum number of groups g. Here, m is an integer equal to or greater than 2. The input unit 10 outputs the share $\{e\}$ of the flag e to the flag conversion unit 11. The input unit 10 also outputs the share $\{\{\sigma\}\}$ of permutation $\sigma$ to the sorting unit 13.

The flag e is a flag representing a boundary between groups. For example, where records having the same value of a key attribute are placed in the same group when a stable sort is performed on a table by the key attribute, the flag e is such a flag that sets a value corresponding to the last element of each group (that is, the element immediately before the boundary of the group) to true (for example, 1) and values corresponding to the other elements to false (for example, 0). A stable sort refers to a kind of sorting operation that preserves an order among elements having the same value in a case where elements of the same value exist. For example, when a stable sort by gender is performed on a table that has been sorted by employee number, it yields a sorting result in which the order of employee numbers is maintained in each gender. In the following, each element of $\{e\} \in \{B\}^m$ can also be referred to by $\{e_i\} \in \{B\}$ (i=0, ..., m−1).

The permutation $\sigma$ is a permutation that arranges the values of the key attribute in each group from beginning one by one. For example, where records having the same value of a key attribute are placed in the same group when a stable sort is performed on a table by the key attribute, the permutation $\sigma$ is a permutation that moves elements such that the last elements of each group are sequentially arranged from beginning and then the other elements are sequentially arranged.

The maximum number of groups g is the number of combinations of possible values of key attributes, that is, the number of kinds of possible values of the key attributes.

At step S11, the flag conversion unit 11 of each secure computation apparatus $1_n$ converts the share $\{e\} \in \{B\}^m$ of the flag e to a share $[e] \in [F]^m$ by secret sharing on an arbitrary ring F. The flag conversion unit 11 outputs the share $[e]$ of the flag e to the boundary number setting unit 12.

At step S12, the boundary number setting unit 12 of each secure computation apparatus $1_n$ generates a share $[x] \in [F]^m$ that becomes a vector $x:=x_0, \ldots, x_{m-1} \in F$ when reconstructed, using the share $[e]$ of the flag e, by setting $[x_i]:=[e_i?i+1:m]$ for each integer i greater than or equal to 0 and smaller than or equal to m−1. Here, "?" is a conditional operator (or a tertiary operator). That is, $[x_i]:=[i+1]$ will be set when $[e_i]$ is true (for example, $[e_i]=[1]$), and $[x_i]:=[m]$ will be set when $[e_i]$ is false (for example, $[e_i]=[0]$). The vector x is such that, where records having the same value of a key attribute are placed in the same group when a stable sort is performed on a table by the key attribute, the position of the next element from beginning is set in the last element of each group, and the number of records contained in the entire table is set in the other elements. In other words, in the last element of each group, the total number of records summed up from the first group through that group will be set. The boundary number setting unit 12 outputs the share $[x]$ of the vector x to the sorting unit 13.

At step S13, the sorting unit 13 of each secure computation apparatus $1_n$ generates a share $[\sigma(x)] \in [F]^m$ that becomes a sorted vector $\sigma(x)$ which is the vector x as sorted by the permutation $\sigma$ when reconstructed, using the share $[x]$ of the vector x and the share $\{\{\sigma\}\}$ of the permutation $\sigma$. In the following, each element of $[\sigma(x)] \in [F]^m$ can also be referred to by $[\sigma(x)_i] \in [F]$ ($i=0, \ldots, m-1$). The sorting unit 13 outputs the share $[\sigma(x)]$ of the sorted vector $\sigma(x)$ to the count calculation unit 14.

At step S14, the count calculation unit 14 of each secure computation apparatus $1_n$ generates a share $[c] \in [F]^{min(g,m)}$ that becomes a vector $c := c_0, \ldots, c_{min(g,m)-1} \in F$ representing the number of records in each group when reconstructed, using the share $[\sigma(x)]$ of the sorted vector $\sigma(x)$, by setting $[c_i] := [\sigma(x)_i - \sigma(x)_{i-1}]$ for each integer $i$ greater than or equal to 1 and smaller than or equal to $min(g,m)-1$ and setting $[c_0] := [\sigma(x)_0]$. Since the total number of records summed up from the 0th through ith groups is set in the ith element $\sigma(x)_i$ of the sorted vector $\sigma(x)$, the number of records in the ith group will be set in the ith element $c_i$ of vector $c$. Because the key attributes are concealed, $min(g,m)$ is the maximum value that can be assumed by the number of groups, and the actual number of groups will be a value that is equal to or smaller than $min(g,m)$ and that cannot be known to each secure computation apparatus $1_n$ (hereinbelow, the actual number of groups is denoted as $g'$). Thus, for those of $min(g,m)$ shares $[c_i]$ that exceed the actual number of groups (that is, $i \geq g'$), it is necessary to set an invalid value that becomes distinguishable from a valid value after reconstruction. In the present embodiment, $[x_i] = m$ is set for those shares $[x_i]$ with $[e_i]$ being false or the last share $[x_i]$ among those with $[e_i]$ being true. Thus, $\sigma(x)_i - \sigma(x)_{i-1} = m - m = 0$ is set for $c_{g'}, \ldots, c_{min(g,m)-1}$. Since the count of groups in which records exist is one or greater, 0 is applicable as an invalid value that becomes distinguishable from a valid value. The count calculation unit 14 outputs the share $[c]$ of the number of records $c$ to the output unit 15.

At step S15, the output unit 15 of each secure computation apparatus $1_n$ outputs the share $[c]$ of the number of records $c$.

<Modification>

In the embodiment above, an arrangement where the share $\{e\}$ of the flag $e$ and the share $\{\{\sigma\}\}$ of the permutation $\sigma$ are input to the input unit 10 was described. As a modification thereof, an arrangement is described where a share obtained by concealing of a table by secret sharing and the like is input to the input unit 10, the share $\{e\}$ of the flag $e$ and the share $\{\{\sigma\}\}$ of the permutation $\sigma$ are determined, and then a group-by count is calculated in accordance with the procedure described in the embodiment.

Figure 4:
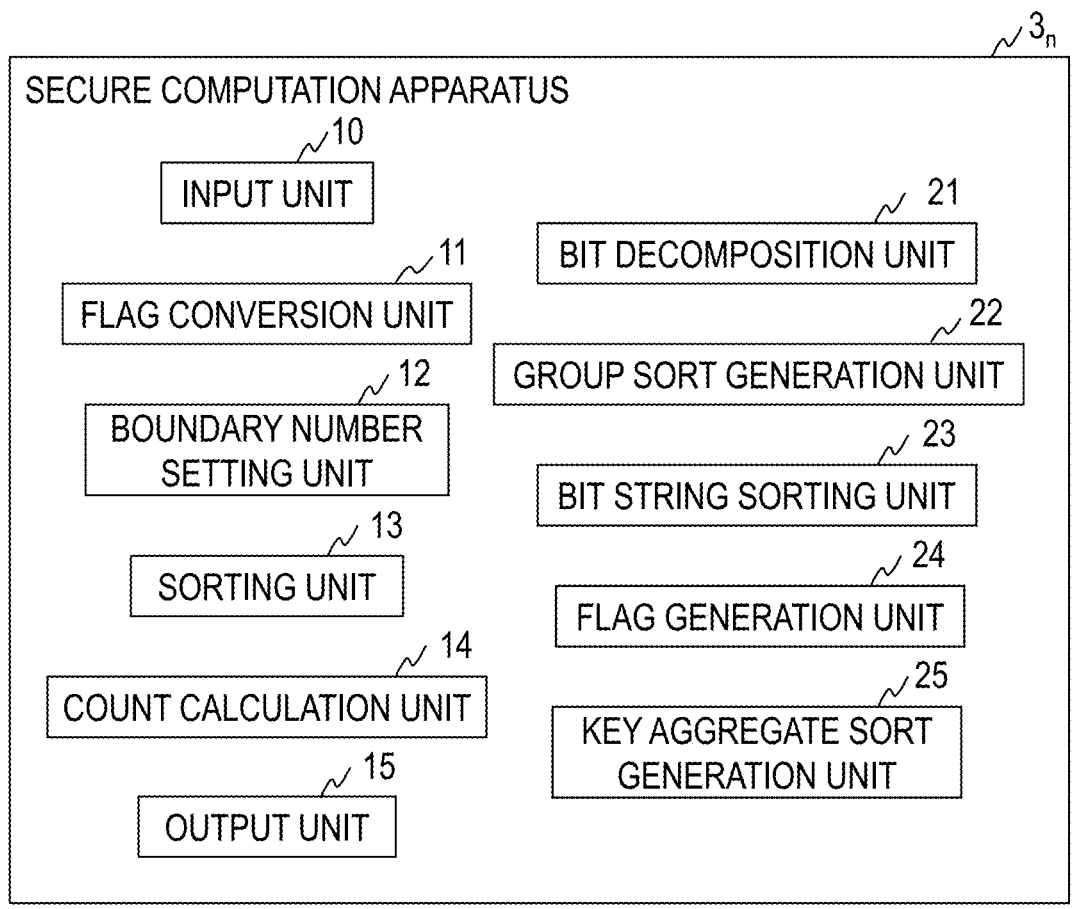
FIG. 4 illustrates a functional configuration of a secure computation apparatus according to a modification.

A secure computation apparatus $3_n$ ($n=1, \ldots, N$) according to the modification includes a bit decomposition unit 21, a group sort generation unit 22, a bit string sorting unit 23, a flag generation unit 24, and a key aggregate sort generation unit 25, for example, as shown in FIG. 4, in addition to the processing units of the secure computation apparatus $1_n$ ($n=1, \ldots, N$) of the embodiment. In the following, only differences from the secure cross tabulation system of the embodiment are described.

The input unit 10 of each secure computation apparatus $3_n$ receives, as input, shares $[k_0], \ldots, [k_{nk-1}] \in [F]^m$ obtained by concealing each of $n_k$ key attributes $k_0, \ldots, k_{nk-1} \in F^m$ by secret sharing and shares $[v_0], \ldots, [v_{na-1}] \in [F]^m$ obtained by concealing each of $n_a$ value attributes $v_0, \ldots, v_{na-1} \in F^m$ by secret sharing. Here, $n_k$ and $n_a$ are integers equal to or greater than 1. In the following, each element of $[k_j] \in [F]^m$ ($j=0, \ldots, n_k-1$) can also be referred to by $[k_{j,i}] \in [F]$ ($i=0, \ldots, m-1$). The input unit 10 outputs the shares $[k_0], \ldots, [k_{nk-1}]$ of the key attributes $k_0, \ldots, k_{nk-1}$ to the bit decomposition unit 21.

The bit decomposition unit 21 of each secure computation apparatus $3_n$ applies bit decomposition to the shares $[k_0], \ldots, [k_{nk-1}]$ of the key attributes $k_0, \ldots, k_{nk-1}$ and concatenates them, obtaining a share $\{b\} \in \{B\}^\lambda$ that becomes a bit string $b := b_0, \ldots, b_{m-1} \in B^\lambda$ which is a concatenation of bit representations of the key attributes $k_0, \ldots, k_{nk-1}$ when reconstructed. Here, $\lambda$ is the bit length of the bit string $b$, being the sum of the bit length of each $b_i$ ($i=0, \ldots, m-1$). In other words, $\{b_i\}$ is a bit string obtained by concatenation of bit representations of the respective ith elements $[k_{0,i}], \ldots, [k_{nk-1,i}]$ of the shares $[k_0], \ldots, [k_{nk-1}]$ of the key attributes $k_0, \ldots, k_{nk-1}$. The bit decomposition unit 21 outputs the share $\{b\}$ of the bit string $b$ to the group sort generation unit 22.

The group sort generation unit 22 of each secure computation apparatus $3_n$ generates a share $\{\{\sigma_0\}\} \in \{\{S_m\}\}$ that becomes permutation $\sigma_0$ for performing a stable sort of the bit string $b$ in ascending order when reconstructed, using the share $\{b\}$ of the bit string $b$. As the bit string $b$ is a concatenation of bit representations of the key attributes $k_0, \ldots, k_{nk-1}$, the permutation $\sigma_0$ can also be considered as an operation to rearrange records so that records for which the values of the key attributes $k_0, \ldots, k_{nk-1}$ are equal will be consecutive and group them. The group sort generation unit 22 outputs the share $\{b\}$ of the bit string $b$ and the share $\{\{\sigma_0\}\}$ of the permutation $\sigma_0$ to the bit string sorting unit 23.

The bit string sorting unit 23 of each secure computation apparatus $3_n$ obtains a share $\{b'\} \in \{B\}^\lambda$ that becomes a sorted bit string $b' := b'_0, \ldots, b'_{m-1} \in B^\lambda$ which is the bit string $b$ as sorted by the permutation $\sigma_0$ when reconstructed, using the share $\{b\}$ of the bit string $b$ and the share $\{\{\sigma_0\}\}$ of the permutation $\sigma_0$. The bit string sorting unit 23 outputs the share $\{b'\}$ of the sorted bit string $b'$ to the flag generation unit 24.

The flag generation unit 24 of each secure computation apparatus $3_n$ generates a share $\{e\} \in \{B\}^m$ that becomes the flag $e := e_0, \ldots, e_{m-1} \in B^m$ when reconstructed, using the share $\{b'\}$ of the sorted bit string $b'$, by setting $\{e_i\} := \{b'_i \neq b'_{i+1}\}$ for each integer $i$ greater than or equal to 0 and smaller than or equal to $m-2$ and setting $\{e_{m-1}\} := \{1\}$. Since the flag $e_i$ is set to true when the ith element $b'_i$ of the sorted bit string $b'$ is different from the i+1th element $b'_{i+1}$, it serves as a flag that indicates the last element of each group (that is, the element immediately before the boundary of the group). The flag generation unit 24 outputs the share $\{e\}$ of the flag $e$ to the key aggregate sort generation unit 25. The flag generation unit 24 also outputs the share $\{e\}$ of the flag $e$ to the flag conversion unit 11.

The key aggregate sort generation unit 25 of each secure computation apparatus $3_n$ first generates a share $\{e'\} \in \{B\}^m$ that becomes flag $e'$, which is negation $\neg e$ of the flag $e$, when reconstructed, using the share $\{e\}$ of the flag $e$. That is, $\{e'_i\} := \{\neg e_i\}$ is set for each integer $i$ greater than or equal to 0 and smaller than or equal to $m-1$. Then, the key aggregate sort generation unit 25 generates a share $\{\{\sigma\}\} \in \{\{S_m\}\}$ that becomes the permutation $\sigma$ for performing a stable sort of the flag $e'$ in ascending order when reconstructed, using the share $\{e'\}$ of flag $e'$. The key aggregate sort generation unit 25 outputs the share $\{\{\sigma\}\}$ of the permutation $\sigma$ to the sorting unit 13.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of an apparatus executing the process or on any necessity, rather than being executed in time series in accordance with the described order.

[Program and Recording Medium]

When various types of processing functions in the apparatuses described in the above embodiments are implemented on a computer, the contents of processing function to be contained in each apparatus is written by a program. With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present apparatus is configured with a predetermined program executed on a computer. However, the present apparatus may be configured with at least part of these processing contents realized in a hardware manner.

What is claimed is:

1. A secure cross tabulation system comprising:
a plurality of secure computation apparatuses, wherein m is an integer equal to or greater than 2; $[e]:=[e_0], \ldots, [e_{m-1}]$ is a share obtained by secret sharing of a flag $e:=e_0, \ldots, e_{m-1}$ in which last elements of each group are true and other elements are false when a table formed of a key attribute and a value attribute is grouped based on a value of the key attribute; $\{\{\sigma\}\}$ is a share obtained by secret sharing of a permutation a which moves elements such that the last elements of each group are sequentially arranged from beginning when the table is grouped based on the value of the key attribute; and g is a maximum number of such groups, and
each of the secure computation apparatuses comprising processing circuitry configured to, in cooperation with each other:
generate a share [x] that becomes a vector $x:=x_0, \ldots, x_{m-1}$ when reconstructed, using the share [e], by setting $[x_i]:=[i+1]$ when $[e_i]$ is true and setting $[x_i]:=[m]$ when $[e_i]$ is false for each integer i greater than or equal to 0 and smaller than or equal to m−1,
generate a share $[\sigma(x)]$ that becomes a sorted vector $\sigma(x)$ which is the vector x as sorted by the permutation $\sigma$ when reconstructed, using the share [x] and the share $\{\{\sigma\}\}$,
generate a share [c] that becomes a vector $c:=c_0, \ldots, c_{min(g,m)-1}$ representing the number of records in each group when reconstructed, using the share $[\sigma(x)]$, by setting $[c_i]:=[\sigma(x)_i-\sigma(x)_{i-1}]$ for each integer i greater than or equal to 1 and smaller than or equal to min(g, m)−1 and setting $[c_0]:=[\sigma(x)_0]$, and
output the share [c] of the number of records without revealing the share [e].

2. The secure cross tabulation system according to claim 1, wherein
F is an arbitrary ring; nk is an integer greater than or equal to 1; and $[k_0], [k_{nk-1}]$ are shares obtained by secret sharing of key attributes $k_0, k_{nk-1} \in F_m$, and
the processing circuitry is further configured to:
generate, from a share {b} that becomes a bit string $b:=b_0, \ldots, b_{m-1}$ obtained by bit decomposition and concatenation of the key attributes $k_0, \ldots, k_{nk-1}$ when reconstructed, a share $\{\{\sigma_0\}\}$ that becomes permutation $\sigma_0$ for performing a stable sort of the bit string b in ascending order when reconstructed, using the shares $[k_0], \ldots, [k_{nk-1}]$,
generate a share {b'} that becomes a sorted bit string $b':=b'_0, \ldots, b'_{m-1}$ which is the bit string b as sorted by the permutation $\sigma_0$ when reconstructed, using the share {b} and the share $\{\{\sigma_0\}\}$,
generate the share {e} that becomes the flag $e:=e_0, \ldots, e_{m-1}$ when reconstructed, using the share {b'}, by setting $\{e_i\}:=\{b'_i \neq b'_{i+1}\}$ for each integer i greater than or equal to 0 and smaller than or equal to m−2 and setting $\{e_{m-1}\}:=\{1\}$, and
generate the share $\{\{\sigma\}\}$ that becomes the permutation a for performing a stable sort of negation ¬e of the flag e in ascending order when reconstructed, using the share {e}.

3. A secure computation apparatus,
where m is an integer equal to or greater than 2; $[e]:=[e_0], [e_{m-1}]$ is a share obtained by secret sharing of a flag $e:=e_0, \ldots, e_{m-1}$ in which last elements of each group are true and other elements are false when a table formed of a key attribute and a value attribute is grouped based on a value of the key attribute; $\{\{\sigma\}\}$ is a share obtained by secret sharing of a permutation a which moves elements such that the last elements of each group are sequentially arranged from beginning when the table is grouped based on the value of the key attribute; and g is a maximum number of such groups,
the secure computation apparatus comprising processing circuitry configured to, in cooperation with other secure computation apparatuses:
generate a share [x] that becomes a vector $x:=x_0, \ldots, x_{m-1}$ when reconstructed, using the share [e], by setting $[x_i]:=[i+1]$ when $[e_i]$ is true and set $[x_i]:=[m]$ when $[e_i]$ is false for each integer i greater than or equal to 0 and smaller than or equal to m−1, generate a share $[\sigma(x)]$ that becomes a sorted vector $\sigma(x)$ which is the vector x as sorted by the permutation a when reconstructed, using the share $[x]$ and the share $\{\{\sigma\}\}$;

generate a share $[c]$ that becomes a vector $c:=c_0, \ldots, c_{min(g,m)-1}$ representing the number of records in each group when reconstructed, using the share $[\sigma(x)]$, by setting $[c_i]:=[\sigma(x)_i-\sigma(x)_{i-1}]$ for each integer i greater than or equal to 1 and smaller than or equal to $min(g,m)-1$ and setting $[c_0]:=[\sigma(x)_0]$; and output the share $[c]$ of the number of records without revealing the share $[e]$.

4. A secure cross tabulation method for execution by a secure cross tabulation system including a plurality of secure computation apparatuses, wherein m is an integer equal to or greater than 2; $[e]:=[e_0], \ldots, [e_{m-1}]$ is a share obtained by secret sharing of a flag $e:=e_0, \ldots, e_{m-1}$ in which last elements of each group are true and other elements are false when a table formed of a key attribute and a value attribute is grouped based on a value of the key attribute; $\{\{\sigma\}\}$ is a share obtained by secret sharing of a permutation a which moves elements such that the last elements of each group are sequentially arranged from beginning when the table is grouped based on the value of the key attribute; and g is a maximum number of such groups, the secure cross tabulation method comprising:

generating, by processing circuitry of each of the secure computation apparatuses working in cooperation with each other, a share $[x]$ that becomes a vector $x:=x_0, \ldots, x_{m-1}$ when reconstructed, using the share $[e]$, by setting $[x_i]:=[i+1]$ when $[e_i]$ is true and set $[x_i]:=[m]$ when $[e_i]$ is false for each integer i greater than or equal to 0 and smaller than or equal to m−1, generating, by the processing circuitry of each of the secure computation apparatus working in cooperation with each other, a share $[\sigma(x)]$ that becomes a sorted vector $\sigma(x)$ which is the vector x as sorted by the permutation a when reconstructed, using the share $[x]$ and the share $\{\{\sigma\}\}$, generating, by the processing circuitry of each of the secure computation apparatus working in cooperation with each other, a share $[c]$ that becomes a vector $c:=c_0, \ldots, c_{min(g,m)-1}$ representing the number of records in each group when reconstructed, using the share $[\sigma(x)]$, by setting $[c_i]:=[\sigma(x)_i-\sigma(x)_{i-1}]$ for each integer i greater than or equal to 1 and smaller than or equal to $min(g,m)-1$ and setting $[c_0]:=[\sigma(x)_0]$, and outputting the share $[c]$ of the number of records without revealing the share $[e]$.

5. A non-transitory computer-readable recording medium on which a program recorded thereon for causing a computer to function as the secure computation apparatus according to claim 3.

6. The secure cross tabulation system according to claim 1, wherein to cooperate with each other, the plurality of secure computation apparatuses communicate with each other over a network.

7. The secure cross tabulation system according to claim 6, wherein the network is one of a packet-switched network and a circuitry-switched network.

8. The secure cross tabulation system according to claim 6, wherein the network is a local area network (LAN) or a wide area network (WAN).

9. The secure computation apparatus according to claim 3, wherein to cooperate with the other secure computation apparatuses, the secure computation apparatus communicates with the other secure computation apparatuses via a network.

10. The secure computation apparatus according to claim 9, wherein the network is one of a packet-switched network and a circuitry-switched network.

11. The secure computation apparatus according to claim 9, wherein the network is a local area network (LAN) or a wide area network (WAN).

12. The secure cross tabulation method to claim 4, wherein to cooperate with each other, the plurality of secure computation apparatuses communicate with each other over a network.

13. The secure cross tabulation method according to claim 12, wherein the network is one of a packet-switched network and a circuitry-switched network.

14. The secure cross tabulation method according to claim 2, wherein the network is a local area network (LAN) or a wide area network (WAN).

* * * * *